(12) United States Patent
Dermosessian

(10) Patent No.: US 10,026,042 B2
(45) Date of Patent: Jul. 17, 2018

(54) PUBLIC PARKING SPACE REMOTE RESERVATION SYSTEM

(71) Applicant: Raphael Dermosessian, Montreal (CA)

(72) Inventor: Raphael Dermosessian, Montreal (CA)

(*) Notice: Subject to any disclaimer, the term of this patent is extended or adjusted under 35 U.S.C. 154(b) by 127 days.

(21) Appl. No.: 14/996,184

(22) Filed: Jan. 14, 2016

(65) Prior Publication Data

US 2017/0206471 A1    Jul. 20, 2017

(51) Int. Cl.
| | |
|---|---|
| *G06Q 10/02* | (2012.01) |
| *G06Q 50/10* | (2012.01) |
| *G06F 17/30* | (2006.01) |
| *G06Q 20/26* | (2012.01) |
| *G06Q 50/30* | (2012.01) |
| *G06Q 20/20* | (2012.01) |

(Continued)

(52) U.S. Cl.
CPC .......... *G06Q 10/02* (2013.01); *G01C 21/3679* (2013.01); *G06F 17/30345* (2013.01); *G06Q 20/203* (2013.01); *G06Q 20/26* (2013.01); *G06Q 50/10* (2013.01); *G06Q 50/30* (2013.01); *G07B 15/02* (2013.01)

(58) Field of Classification Search
CPC ........ G06Q 10/02; G06Q 50/30; G06Q 50/10; G06Q 17/30345; G06Q 20/20; G07B 15/02; G08G 1/14; G08G 1/144; G08G 1/147; G08G 1/146; G08G 1/143; G08G 1/148; G01C 21/3605; G01C 21/34; G01C 21/3679
USPC ..................................... 705/5, 13; 340/932.2
See application file for complete search history.

(56) References Cited

U.S. PATENT DOCUMENTS

| | | | |
|---|---|---|---|
| 6,411,895 B1 * | 6/2002 | Lau | G01C 21/3605 340/932.2 |
| 7,956,769 B1 * | 6/2011 | Pearl | G08G 1/14 340/539.1 |

(Continued)

OTHER PUBLICATIONS

Liu, Jingbin et al. "iParking: An Intelligent Indoor Location-Based Smartphone Parking Service" (2012), Sensors 12.11: 14612-14629. MDPI AG. (Year: 2012).*

(Continued)

*Primary Examiner* — Michael P Harrington
*Assistant Examiner* — Brian A Tallman
(74) *Attorney, Agent, or Firm* — Benoit & Cote, Inc.; C. Marc Benoit

(57) ABSTRACT

There is described a method for reserving a parking space for a vehicle using a web-enabled computing device and its positioning system. The method comprises:
  requesting, while the mobile computing device is at a present location, an unreserved and/or unoccupied parking space thereby defining a selected parking space;
  computing an estimated travel time from the present location of the mobile computing device to the selected parking space;
  based on the estimated travel time, automatically calculating, an initial reservation period for the selected parking space;
  accepting the initial reservation period; and
  upon the accepting, generating and transmitting a reservation signal to the parking system database, the reservation signal comprising an ID of, and the initial reservation period for, the selected parking space and instructions for changing the status of the selected parking space from unreserved to reserved.

21 Claims, 10 Drawing Sheets

(51) Int. Cl.
*G01C 21/36* (2006.01)
*G07B 15/02* (2011.01)

(56) References Cited

U.S. PATENT DOCUMENTS

| | | | |
|---|---|---|---|
| 2002/0116235 A1 | 8/2002 | Grimm | |
| 2003/0092387 A1* | 5/2003 | Hjelmvik | G06Q 20/127 455/41.1 |
| 2003/0144890 A1 | 7/2003 | Dan | |
| 2004/0181439 A1 | 9/2004 | Kakuta | |
| 2004/0254840 A1* | 12/2004 | Slemmer | G06Q 10/02 705/22 |
| 2007/0129974 A1 | 6/2007 | Chen | |
| 2010/0198626 A1 | 8/2010 | Cho | |
| 2011/0022427 A1 | 1/2011 | Dayan | |
| 2012/0095790 A1* | 4/2012 | Stefik | G06Q 10/02 705/5 |
| 2012/0095792 A1* | 4/2012 | Stefik | G06Q 10/02 705/5 |
| 2012/0143639 A1 | 6/2012 | Rollert | |
| 2013/0179383 A1* | 7/2013 | Pringle | G06N 5/02 706/46 |
| 2013/0191189 A1* | 7/2013 | Aparicio | G07B 15/02 705/13 |
| 2013/0249711 A1* | 9/2013 | Vellore Sripathi Rao | G08G 1/02 340/932.2 |
| 2013/0265174 A1* | 10/2013 | Scofield | G01C 21/34 340/932.2 |
| 2013/0290045 A1 | 10/2013 | Levy | |
| 2013/0346121 A1 | 12/2013 | Shealy | |
| 2014/0089015 A1* | 3/2014 | Stefik | G06Q 10/08 705/5 |
| 2014/0089016 A1 | 3/2014 | Smullin | |
| 2014/0149153 A1 | 5/2014 | Cassandras | |
| 2014/0167985 A1* | 6/2014 | Halnais | B60L 11/1816 340/901 |
| 2014/0236645 A1* | 8/2014 | Aaron | G06Q 10/02 705/5 |
| 2015/0009047 A1* | 1/2015 | Ashkenazi | G08G 1/144 340/932.2 |
| 2015/0130642 A1* | 5/2015 | Huang | G08G 1/143 340/932.2 |
| 2015/0242827 A1* | 8/2015 | Guo | G06Q 50/30 705/13 |
| 2016/0133085 A1* | 5/2016 | Eagon | G07F 17/24 705/13 |

OTHER PUBLICATIONS http://spthero.com/search [Jun. 13, 2014].
http://vancouver.ca/streets-transportation/reserve-metered-spaces.aspx [Apr. 15, 2014].
http://www.businessinsider.com/the-10-hottest-apps-in-may-2014-5-5?op=1 [Jun. 13, 2014].
Improved Prepayment in San Francisco [Apr. 15, 2014].
moneyparking.striningly.com/ [Jun. 13, 2014].
www.neoparking.com/paris[Jun. 13, 2014].

\* cited by examiner

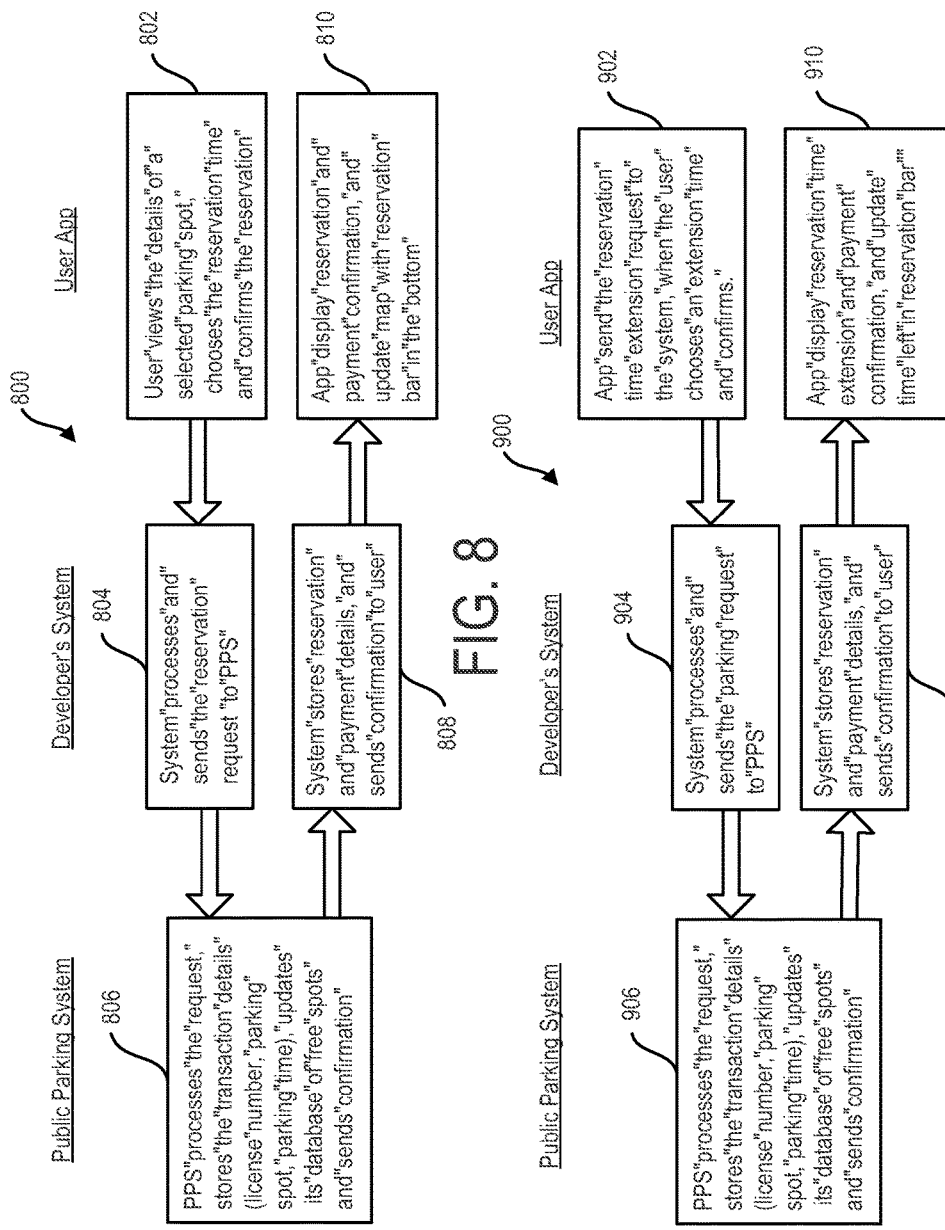

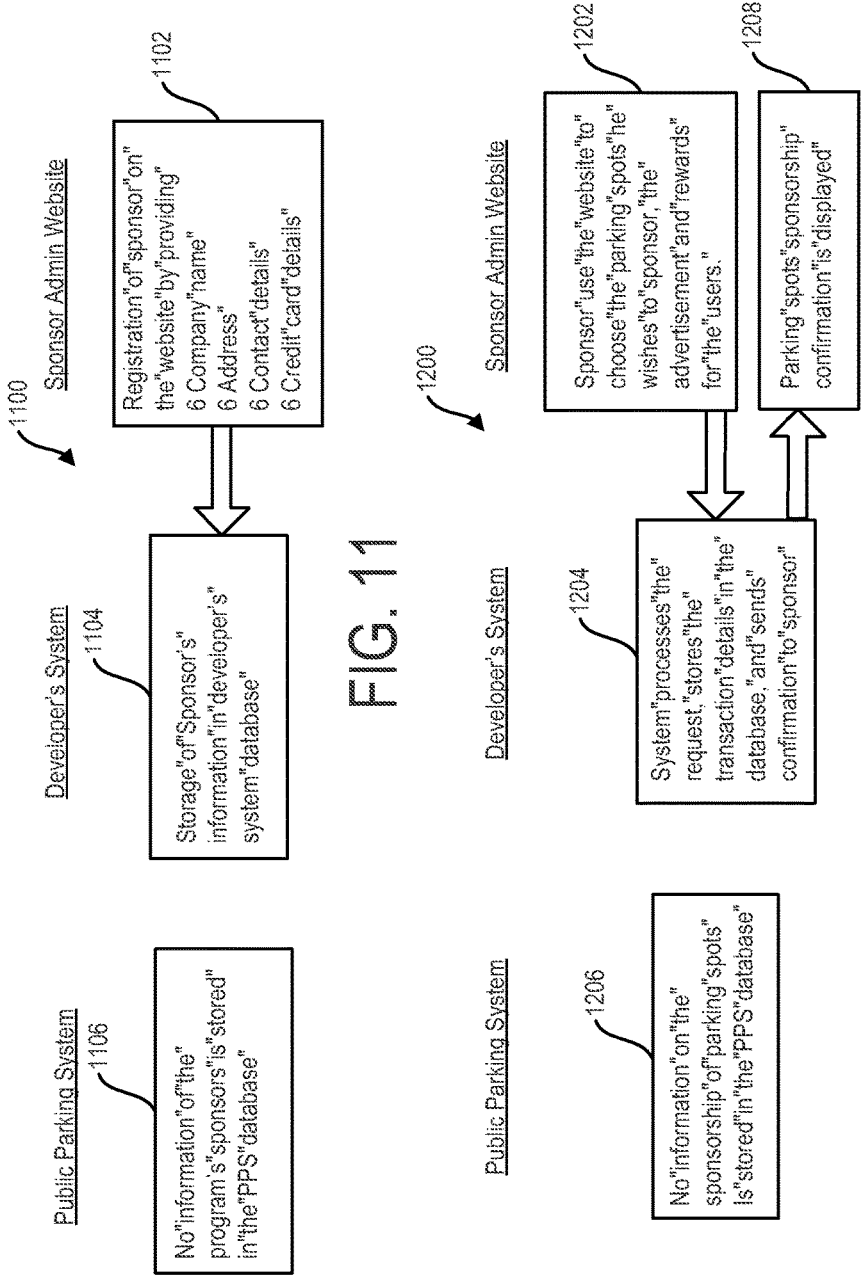

PUBLIC PARKING SPACE REMOTE RESERVATION SYSTEM

BACKGROUND (a) Field

The subject matter disclosed generally relates to applications on web-enabled computing devices and related systems. More specifically, it relates to systems and methods which provide a means for reserving a parking space.

(b) Related Prior Art

Most major cities around the globe are turning parking spaces into rentable bike systems in an effort to make the cities less congested with traffic and to reduce pollution. This has proven to be a nuisance to those who need to find a parking space for their cars especially when a person is short on time.

In an effort to transform major North American cities into Eco-Friendly environment, several measures have been taken to reduce carbon emissions, in addition to optimizing available systems.

Under the pretext of "optimization", the presently described parking space reservation system was developed.

SUMMARY

Prior art systems require the installation of fixed physical indicators (e.g., a light that change color, a changing panel, etc.) to indicate if an unoccupied parking space is reserved or unreserved. The technical solutions to these technical problems are discussed and disclosed herein.

In some embodiments, the technical solutions include the use of geo-location information (e.g., coordinate information) for each parking space which is stored in a parking system database. The parking system database can be operated by public authorities (e.g., a city). The technical solutions may also include the use of the positions systems of web-enabled computing devices (which include mobile computing devices). The foregoing positioning systems are involved in calculating a reservation period to be confirmed by a user. The use of fixed physical indicators is thereby rendered unnecessary.

The proposed technical solutions also provide information about the status of the parking spaces; e.g., reserved, unreserved, occupied, unoccupied, etc. or any logical combination thereof that is updated on a continuous basis.

In other embodiments, the technical solutions described herein include the use of positioning systems in each vehicle.

Another technical problem with prior art systems for reserving parking spaces is that there is a need to install and to use fixed physical sensors (weight sensors, light (or other wavelength) emission/detection sensors, etc.) for each parking space to determine if a parking space is occupied or not. The technical solution to this problem involve the comparison of the position given by the positioning system (of the web-enabled computing device or of the vehicle) with the geo-location information for a given (e.g., selected) parking space.

With the increased effort in all major cities to reduce cars in the city to minimize traffic and pollution, the parking space reservation system described herein will help better manage and optimize the availability and use of parking spaces in the city. The parking space reservation system described herein will implement a method to a better manage and optimize the availability and use of parking spaces in the city.

This concept is based on a system that links available public facilities/services and connects them to a specialized web based server to deliver a service that will make a commuter's life more efficient.

Advantages & Features

This concept will primarily help the application users to reserve a parking space without going into the hassle of finding their requirement physically, particularly in rush hours, tight schedules and harsh weather conditions. The system will serve as a platform that executes a series of steps of a process that will enable the user to find a convenient parking space remotely that will optimize both his circulation and inner city traffic.

This concept will help identify all available (i.e., unoccupied) parking spaces within the vicinity of the user's parking requirement within his immediate circle, within a set radius determined by the user, and a different location.

The presently described concept can work without the use of fixed sensors installed for each parking space. This is made possible by using the geo-location information for each parking space which is stored in the parking system database. The parking system database can be operated by public authorities (e.g., a city).

Also, the positioning system of a web-enabled mobile computing device used to make the reservation (the web-enabled mobile computing device normally being carried by the user who made the reservation and who is present in the vehicle that is being parked) is also used to determine the position of the web-enabled mobile computing device (which is assimilated to be the position of the vehicle). In another embodiment, vehicles are equipped with their own positioning system thereby simplifying the determination of the position of the vehicle. In both previously described vehicle positioning methods, each vehicle has a unique ID which is stored in a parking system database. Furthermore, each of the parking spaces is uniquely identified and is geo-located. By comparing the position of the vehicle with the location of parking space, it is possible to determine whether a vehicle is parking in the space which was reserved for it.

It is also possible to reserve a parking space for a pre-set amount of time, e.g., 15 minutes by paying a small fee that will then be included in the total price to pay. A parking space can be reserved based on the user's plans, provided that he is allowed to reserve one parking space at a time; e.g., if the user has a meeting at a preset time, and at a defined location, he can reserve his most convenient parking space ahead of time. However, limitations are pre-set in the application, depending on the city of operations and the city's by-laws along with the city council's agreement to prevent abuse.

If the space is reserved and another person tries to pay by at the parking meter, he will be notified that it is reserved. If a person is paying with the local application/or street meter then the application will notify him as well, he then will have to move his car as priority is given to who has paid earlier.

In case the reserved parking space is occupied by another car, the person will have a report option, where he can notify authorities of this illegal occupation of his reserved parking space where the city can issue a ticket, and in turn give that person free parking in the next available parking space, and in the case of none availability, a credit note for use in the next reservation. This will discourage people of occupying reserved space, and be a source of income added to the city.

Additionally, if the wrong car or person, parks in the parking space, the system can directly notify the authorities.

For safety reasons, the software will not allow you to use the system or reserve if the car is in motion, which will be determined by the GPS readily available in all smart phones.

The system will help locate any car since the use of the system will require the registration of your car details (data collection, DUI parolee, etc.) thus being able to automatically know if a person is breaching his parole.

Payment will be processed once the reservation is performed.

Once a person performs a reservation and he does not arrive and pay for the parking space within the reservation time, the charged amount for reservation will be retained.

The system described herein is compatible with a notification system, such as LED lights, is installed on parking poles, when flashing yellow it means it is reserved so another person wishing to park will be notified and avoid inconvenience. The notification system present on each pole indicates the status of occupancy whether reserved or free.

This application is compatible with available interfaces; e.g., Car Navigation systems. This system relies on available and future operating systems or technology. Most cars are equipped with navigation systems, and an option will be introduced where the navigation system will find the nearest available space within the estimated time of arrival and reserve it for you.

This will apply to, but not limited, to systems such as: GOOGLE® MAPS, GARMIN®, etc.

Companies and other establishments are able to "sponsor" parking spaces using the system. The concept will provide the option to shops surrounding the parking space to "sponsor" the parking spaces.

The sponsors pay for the reserved parking spaces when the customer arrives, and when the customer comes to pay for the parking, he will be notified that this parking space has been paid for by the sponsor.

Sponsorship strategies are decided by the sponsoring companies and establishments, such as email advertising, newsletter, offers, and promotion and the like.

In turn, the sponsor will automatically email advertising, newsletters, offers, and promotions, etc., to the client.

This application will be particular city specific, i.e., it will be adapted to the laws and regulation of specific cities (aka authorities).

According to an embodiment, there is described a method for reserving a parking space for a vehicle using a mobile computing device having a display, a user interface and a positioning system. The method comprises: requesting, on the user interface and while the mobile computing device is at a present location, an unreserved parking space from a plurality of unreserved parking spaces thereby defining a selected unreserved parking space, the unreserved parking spaces being in a location which is different from the present location; using the positioning system, computing an estimated travel time from the present location of the mobile computing device to the selected unreserved parking space; based on the estimated travel time, automatically calculating, and proposing on the user interface, an initial reservation period for the selected unreserved parking space; accepting, on the user interface, the initial reservation period; and upon the accepting, generating and transmitting, from the mobile computing device, a reservation signal to a parking system database, the reservation signal comprising an ID of, and the initial reservation period for, the selected unreserved parking space and instructions for changing a status of the selected parking space from unreserved to reserved in the parking system database.

According to an aspect, the method further comprises accessing, using the mobile computing device, the parking system database to obtain: a status of parking spaces indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces.

According to an aspect, the initial reservation period is greater than the estimated travel time by a set time margin.

It should be understood that "parking system database" is meant to be interpreted broadly here. It can encompass a parking system, a parking system server, a parking system web server, a parking system website, etc. In general, it is meant to include any device or system which stores the information/data related to the plurality of parking spaces from which a parking space can be selected. Its physical location is not a limiting factor in the proposed technical solutions.

According to an aspect, the method further comprises providing, on the user interface, an option to select a revised reservation period which is different from the initial reservation period.

According to an aspect, a difference between the revised reservation period and the initial reservation period is not greater than a limit time margin thereby preventing reservation of a selected unreserved parking space beyond a given threshold period.

According to an aspect, the method further comprises, during the initial reservation period or the revised reservation period, generating and transmitting, from the mobile computing device, an occupation signal to the parking system database, the occupation signal comprising the ID of the selected reserved parking space and instructions for changing the status of the selected parking space from reserved to occupied for an occupation period in the parking system database.

According to an aspect, the method further comprises registering an identity for each of a plurality of vehicles on the parking system database wherein the reservation signal comprises a vehicle identity which is matched to the ID of the selected parking space for which the status is occupied thereby providing a capability to determine whether a vehicle is parked in the parking space for which it is intended.

According to an aspect, the method further comprises, after the status of the selected parking space is changed from reserved to occupied, determining, using the positioning system, a location of the mobile computing device relative to the occupied parking space thereby defining a relative location, and determining, using the relative location and time, whether the vehicle has left the occupied parking space.

According to an aspect, the method further comprises, after determining that the vehicle has left the occupied parking space, crediting a user account for the time remaining in the occupation period.

According to an aspect, the occupation signal further comprises identification of a user account which is associated to the mobile computing device and from which is debited payment for the occupation of the parking space.

According to an aspect, the method further comprises consulting the parking system database to confirm whether the selected parking space is sponsored and, if so, debiting payment for the occupation of the parking space from a sponsor account instead of from the user account.

According to an aspect, the method further comprises showing an advertisement on the user interface upon confirming that the selected parking space is sponsored.

According to an aspect, once a grace period passes after the initial reservation period or the revised reservation period, generating and transmitting, from the mobile computing device, an availability signal to the parking system database, the availability signal comprising the ID of the selected reserved parking space and instructions for changing the status of the selected parking space from reserved to unoccupied in the parking system database.

According to an aspect, a set reservation period is smaller than, and finishes at the same time as, the initial reservation period or the revised reservation period, and further wherein the status of selected reserved parking space is set to unoccupied for occupation by another vehicle until the set reservation period starts.

According to an aspect, the reservation status comprises a reservation status for a future period.

According to an aspect, the requesting comprises: showing, on the display, a map taking into account the present location of the mobile computing device; and selecting, on the user interface, an unreserved parking space from the unreserved parking spaces.

According to an aspect, the method further comprises providing, on the display, a remote location different from the present location and showing the map taking into account the remote location.

According to an aspect, the method further comprises selecting, on the user interface, a distance around the remote location to change a scale of the map thereby resulting in showing more or less unoccupied parking spaces.

According to an aspect, the positioning system computes a speed at which the mobile computing device is moving; and if the mobile computing device is moving above a given threshold speed, preventing the transmitting of the reservation signal.

According to an aspect, producing a signal indicative of a distance to an unoccupied parking space (to issue an alarm or other means of alerting a user).

According to an aspect, the method further comprises providing a position of the vehicle prior to the computing the estimated travel time whereby the position of the vehicle is used in the computing the estimated travel time.

According to an aspect, the computing the estimated travel time comprises computing the estimated travel time from the present location of the mobile computing device to the selected unreserved parking space while using the vehicle.

According to another embodiment, there is described a method for reserving a parking space for a vehicle using a mobile computing device having a display, a user interface and a positioning system. The method comprising: showing, on the display, a map taking into account a present location of the mobile computing device; the mobile computing device accessing a parking system database to obtain: a status of parking spaces on the map indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces on the map; selecting, on the user interface, an unreserved parking space from the unreserved parking spaces; using the positioning system, computing an estimated travel time, including a travel leg using the vehicle, to the selected unreserved parking space; based on the estimated travel time, proposing, on the display, an initial reservation period for the selected unreserved parking space; accepting, on the user interface, the proposed initial reservation period; and upon the accepting, generating and transmitting, from the mobile computing device, a reservation signal to the parking system database, the reservation signal comprising the ID of, and the initial reservation period for, the selected unreserved parking space and instructions for changing the status of the selected parking space from unreserved to reserved in the parking system database.

According to another embodiment, there is described a non-transitory machine readable medium encoded with instructions that cause a web-enabled computing device to perform a method comprising the acts of: obtain a request, while the web-enabled computing device is at a present location, for an unreserved parking space from a plurality of unreserved parking spaces in a parking system database thereby defining a selected unreserved parking space, the unreserved parking spaces being in a location which is different from the present location; computing an estimated travel time from the present location of the web-enabled computing device to the selected unreserved parking space; based on the estimated travel time, automatically calculating an initial reservation period for the selected unreserved parking space; and upon receiving an acceptance of the initial reservation period, generating and transmitting a reservation signal, the reservation signal comprising an ID of, and the initial reservation period for, the selected unreserved parking space and instructions for changing a status of the selected parking space from unreserved to reserved.

It is understood that all possible combinations of the embodiments and aspects described above are included in the present description.

BRIEF DESCRIPTION OF THE DRAWINGS

Further features and advantages of the present disclosure will become apparent from the following detailed description, taken in combination with the appended drawings, in which:

FIG. 8 is a flowchart illustrating a process for reserving a parking space in accordance with an embodiment;

FIG. 9 is a flowchart illustrating a process for revising a reservation period for a parking space in accordance with an embodiment;

FIG. 11 is a flowchart illustrating a process for registering a sponsor in the system in accordance with an embodiment;

FIG. 12 is a flowchart illustrating a process for sponsoring, by a sponsor, selected parking spaces in accordance with an embodiment.

It will be noted that throughout the appended drawings, like features are identified by like reference numerals.

DETAILED DESCRIPTION

Figure 1:
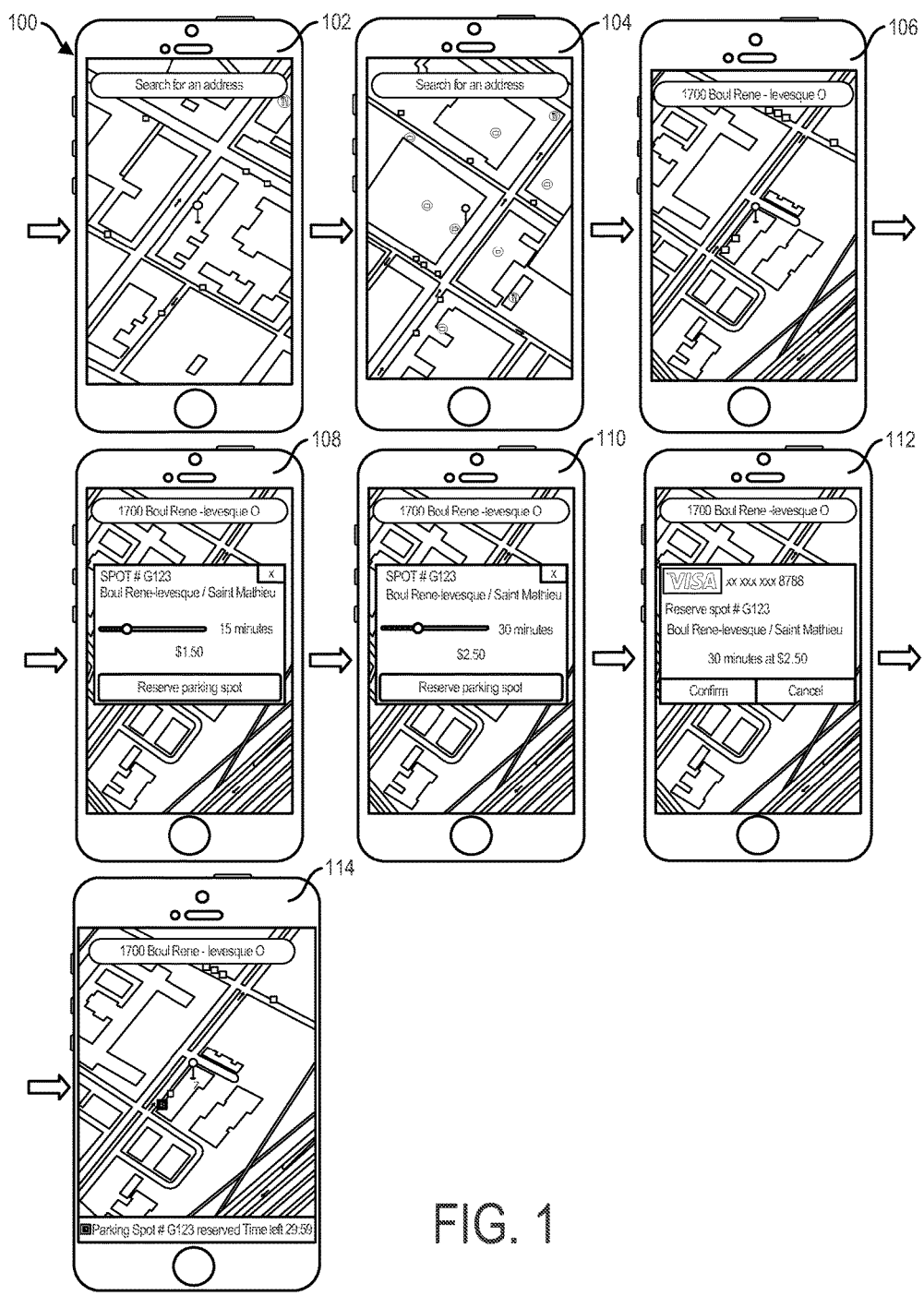
FIG. 1 is a series of screen shots illustrating a method for reserving a parking space for a vehicle in accordance with an embodiment.

Turning to FIG. 1, there is shown a series of screen shots 100 illustrating a method for reserving a parking space for a vehicle in accordance with an embodiment.

To initiate the method, a user accesses a mobile application (aka "application") on the mobile computing device (screen shot 102). The application will mark a pin on the map at the present location of the mobile computing device. The present location is determined by the GPS system of the mobile computing device. The mobile application shows the unreserved parking spaces with dots on the map within a given distance from the pin on the map. A default zoom range is specified in the user's preferences in the mobile application.

A user optionally moves the pin around on the map to a new desired location. The application will automatically update the unoccupied parking spaces around the new location of the pin on the map (screen shot 104).

From screen shot 102 or screen shot 104, a user optionally enters the desired address in the text box. The application will move the pin on the map to the address entered in the text box and automatically update the unoccupied parking spaces around the new location of the pin on the map (screen shot 106).

From screen shot 106, a user selects one of the unreserved parking spaces. The application then displays the reservation details of the selected unreserved parking space (screen shot 108). The reservation details include: the parking space ID (i.e., identifier which can be an alphanumeric code), the parking space location (e.g., coordinates, address, street name with closest crossing street, etc.), an initial reservation period, a total reservation fee to pay, etc.

From screen shot 108, the user optionally uses a time slider to change the initial reservation period to a revised reservation period. The application will update the reservation fee to pay according to the revised reservation period to an updated reservation fee and display the updated reservation fee (screen shot 110).

From screen shot 110, the user completes the reservation of the selected unreserved parking space. He does so by pressing the "reserve" icon on the user interface. The application will display a confirmation window with the following details: payment method to use (e.g., credit card, debit card, PayPal®, other payment account information, etc.), ID of the selected unreserved parking space, the reservation period (initial or revised), total reservation fee to pay, etc. (screen shot 112).

From screen shot 112, the user accepts the reservation details by pressing the "confirm" icon on the user interface.

The application will reserve the parking space for the user and will display a reservation bar showing the reserved parking space ID and the time remaining for the reservation (screen shot 114).

Figure 2:
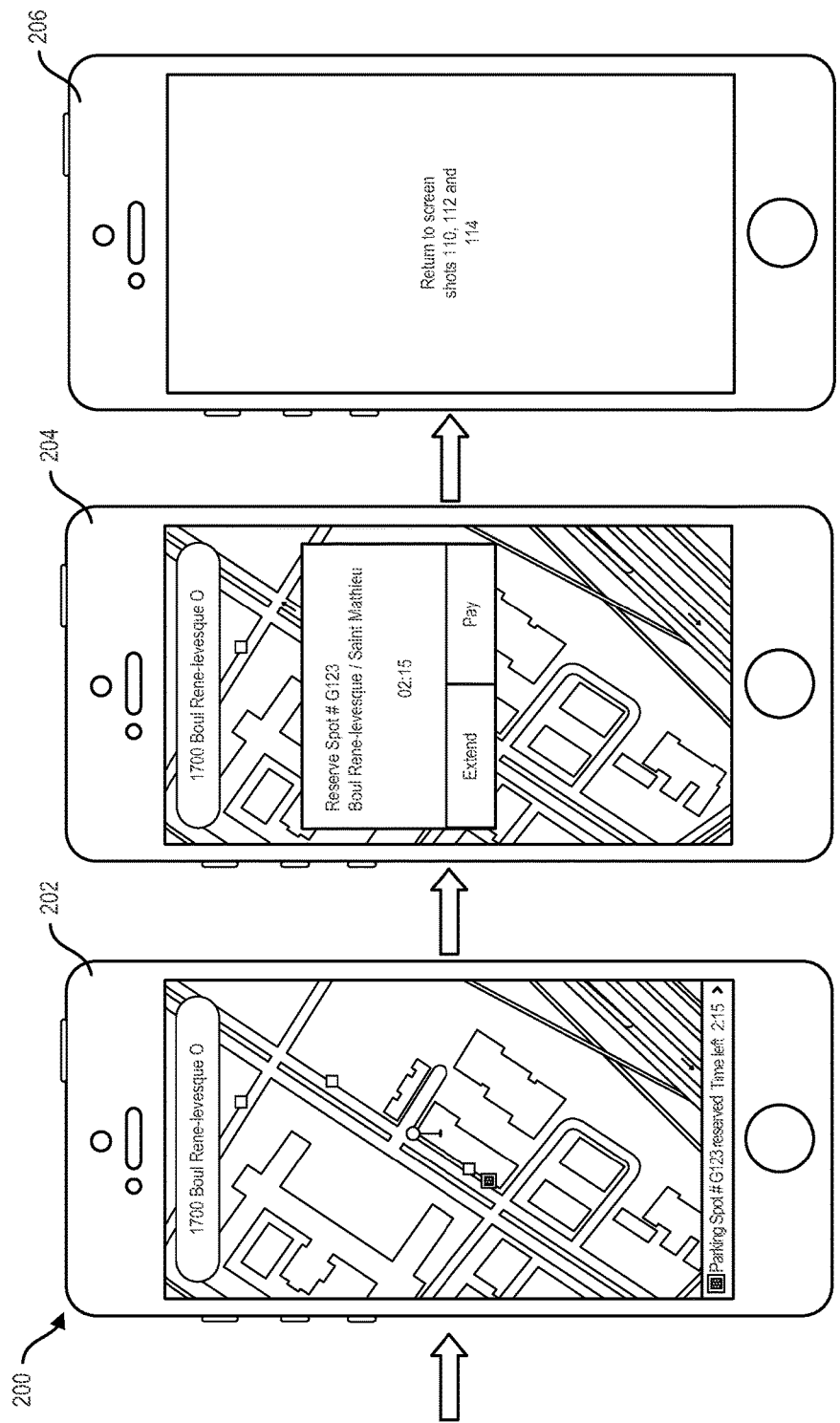
FIG. 2 is a series of screen shots illustrating a method for revising a reservation period for a parking space in accordance with an embodiment.

Now turning to FIG. 2, there is shown a series of screen shots 200 illustrating a method for revising a reservation period for a parking space in accordance with an embodiment.

The user accesses the application. The application display a reservation bar showing the reserved parking space ID and the time remaining for the reservation (screen shot 202).

From screen shot 202, the user presses the reservation bar icon. The application will display a window with the reserved parking space ID, its location and the time remaining for the reservation (screen shot 204). The window also includes an "Extend" button for extending (e.g., revising) the reservation period and a "Pay" button to pay for the selected reserved parking space once the vehicle is parked therein.

From screen shot 204, the user presses the "Extend" button. The application returns to screen shots 110, 112 and 114 to perform the associated steps.

Figure 3:
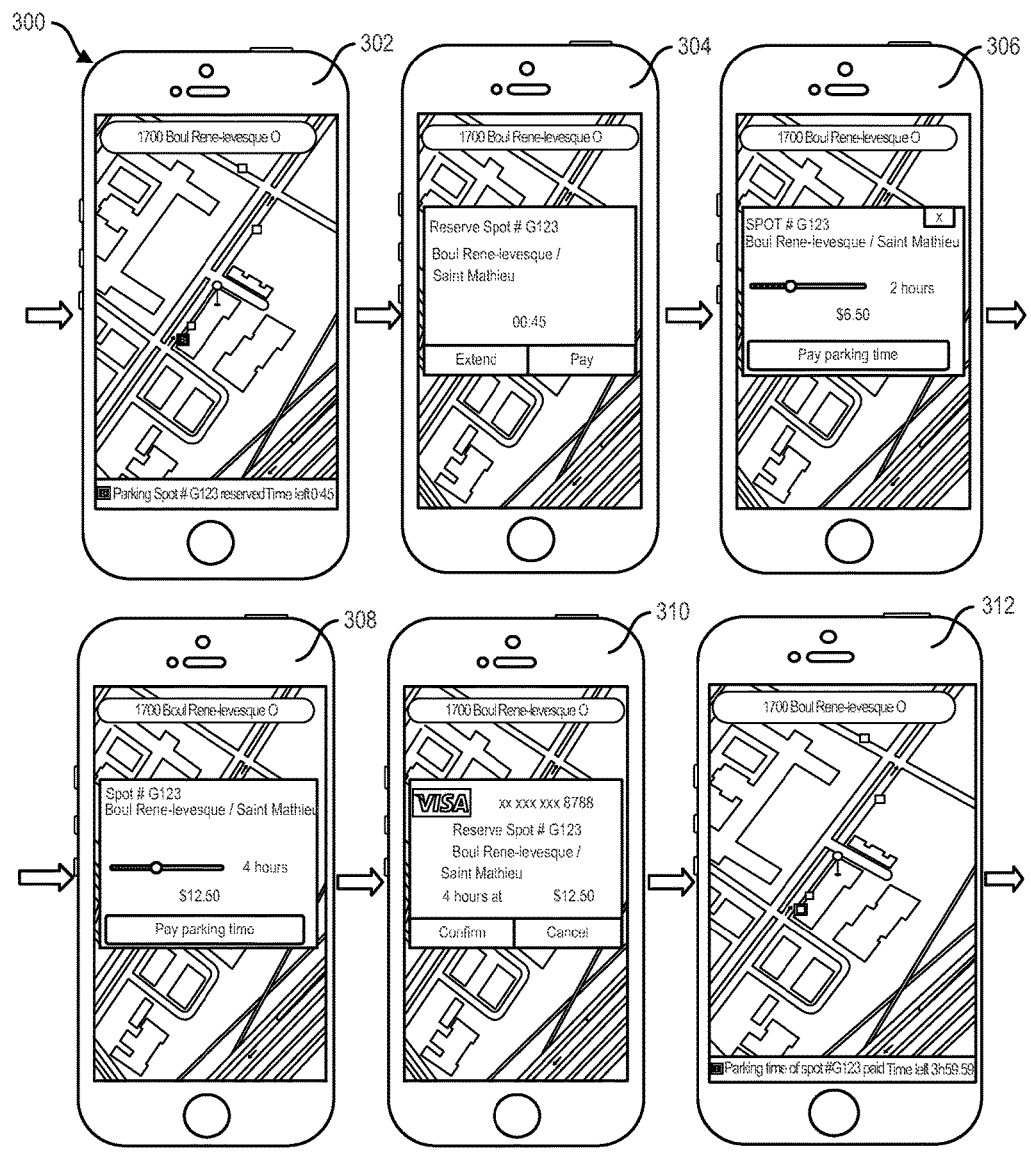
FIG. 3 is a series of screen shots illustrating a method for payment of a reserved parking space for a vehicle in accordance with an embodiment.

Now turning to FIG. 3, there is shown a series of screen shots 300 illustrating a method for payment of a reserved parking space for a vehicle in accordance with an embodiment.

The user accesses the application. The application display a reservation bar showing the reserved parking space ID and the time remaining for the reservation (screen shot 302).

From screen shot 302, the user presses the reservation bar icon. The application will display a window with the reserved parking space ID, its location and the time remaining for the reservation (screen shot 304). The window also includes an "Extend" button for extending (e.g., revising) the reservation period and a "Pay" button to pay for the selected reserved parking space once the vehicle is parked therein.

From screen shot 304, the user presses the "Pay" button to pay for the selected reserved parking space once the vehicle is parked therein thereby changing the status of the selected parking space from reserved to occupied. The application displays the details of the occupied parking space which include: the parking space ID, its location, an initial occupation period, the total amount to pay, etc. (screen shot 306). The application also shows a time slider to change the initial occupation period and a "Pay parking time" icon.

From screen shot 306, the user can optionally change the initial occupation period. The application will update the total amount to pay according to the revised occupation period (screen shot 308).

From screen shot 308, the user presses the "Pay parking time" icon. The application displays a confirmation window with the following information: the parking space ID, its location, an initial occupation period, the total amount to pay, etc. (screen shot 310). The application also shows a "Confirm" icon and a "Cancel" icon.

From screen shot 310, the user presses the "Confirm" icon. The application will confirm the transaction (i.e., make the payment) for the selected and occupied parking space and will display an occupation bar showing the parking space ID and the remaining occupation time (screen shot 312).

Figure 4:
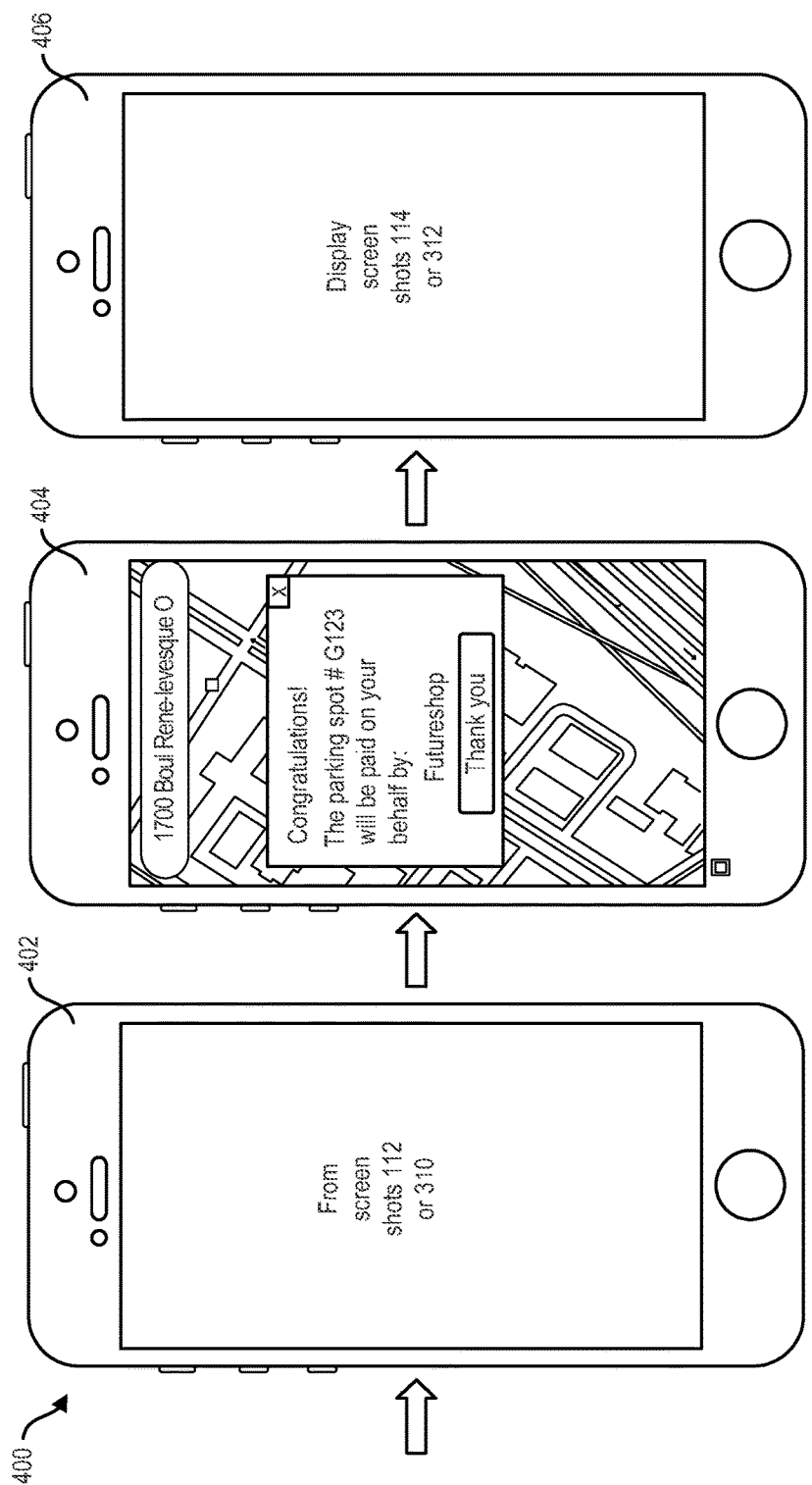
FIG. 4 is a series of screen shots illustrating a method for payment, by an ad sponsor, of a reserved parking space for a vehicle in accordance with an embodiment.

Now turning to FIG. 4, there is shown a series of screen shots 400 illustrating a method for payment, by an ad sponsor, of a reserved parking space for a vehicle in accordance with an embodiment.

This part of the method start at the payment confirmation window shown in either one of screen shot 112 or 310 (screen shot 402). From screen shot 402, the user presses the "Confirm" icon. The application will display a window informing the user that the reservation of occupation time (aka parking time) will be paid by an ad sponsor (screen shot 404). The user then simply presses the "Thank You" icon and, at screen shot 406, the application will display reservation bar or the occupation bar (screen shot 114 or screen shot 312).

Figure 5:
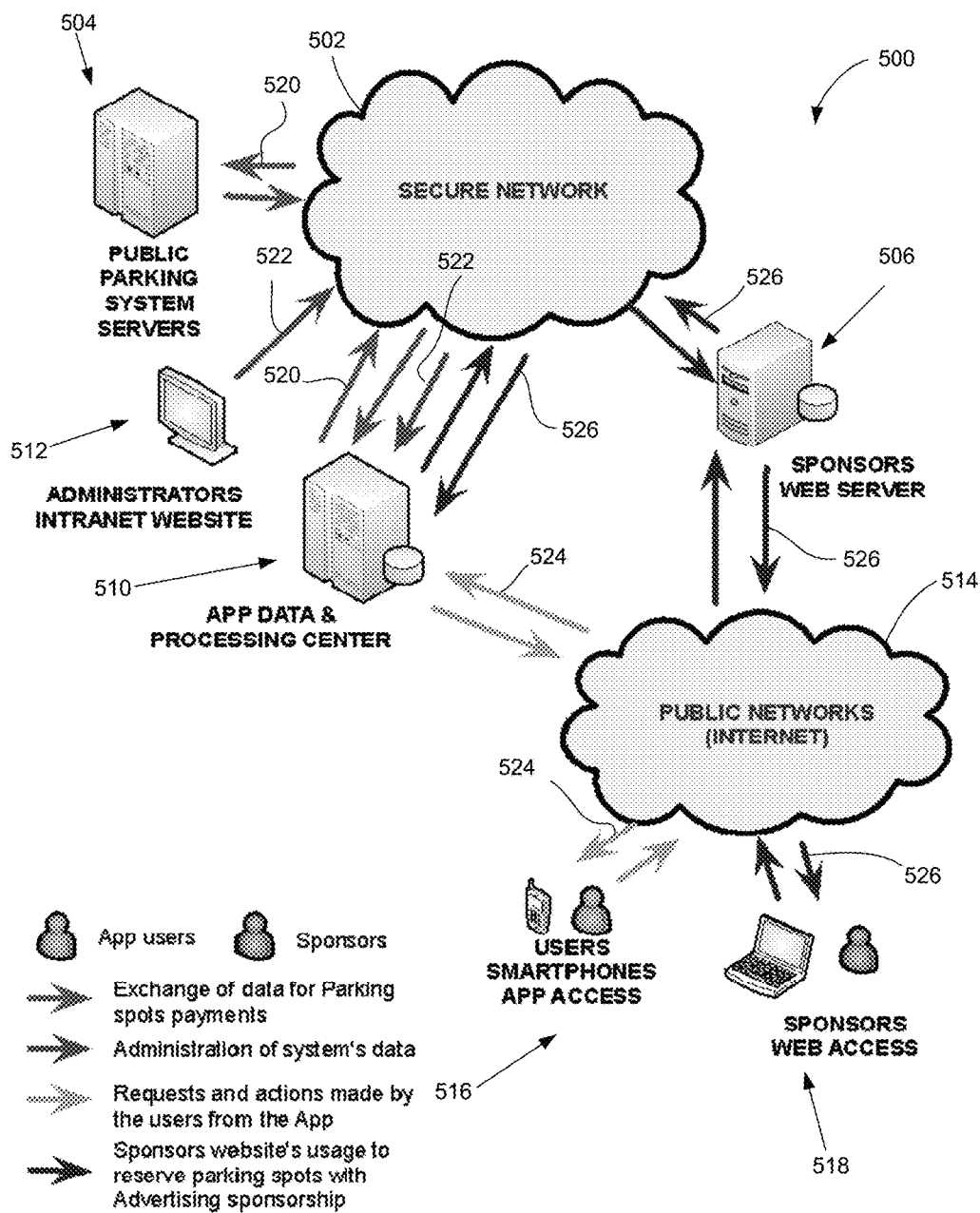
FIG. 5 is a diagram showing an architecture and the flow of data in a system for reserving a parking space for a vehicle in accordance with an embodiment.

Now turning to FIG. 5, there is shown a diagram showing an architecture and the flow of data in a system 500 for reserving a parking space for a vehicle in accordance with an embodiment.

The system 500 comprises a secure network 502 which provides secure communications between:
- the parking system server 504 and an associated parking system database (not shown);
- the administrator intranet website server 512;
- the application data and processing server 510; and
- the sponsor web server 506.

The administrator intranet website server 512 and the sponsor web server 506 in turn communicate, thru public networks 514 (such as the internet and telecom networks), with the users' mobile computing devices 516 (aka smart phones) and the sponsors' web access device 518 (e.g., web-enabled computing devices).

According to an embodiment, the information which is exchanged within system 500 comprises:
- parking space payment data 520;
- system administration data 522;
- sponsors website usage to reserve parking spaces with advertising sponsorship 526; and
- requests and actions made by the user from the application 524.

The application data and processing server 510 comprises: a database (not shown) for storing user information, reservation information and transaction information; a memory (not shown) for storing data and instructions; and a processor (not shown) in communication with the memory. The processor is for executing instructions related to the method described herein which are applicable to application data and processing center 510 which in fact acts as an interface between the mobile computing device 516 and the parking system server 504.

The mobile computing device 516 comprises: a memory (not shown) for storing data and instructions; and a processor (not shown) in communication with the memory. The processor is for executing instructions related to the method described herein which are applicable to the application. The mobile computing device 516 hosts the mobile application described herein.

It should be understood that even though the method is described herein as being embodied as an application on a mobile computing device 516, it could also be operated as a web site on any web-enabled computing device (including one which is not mobile).

Figure 6:
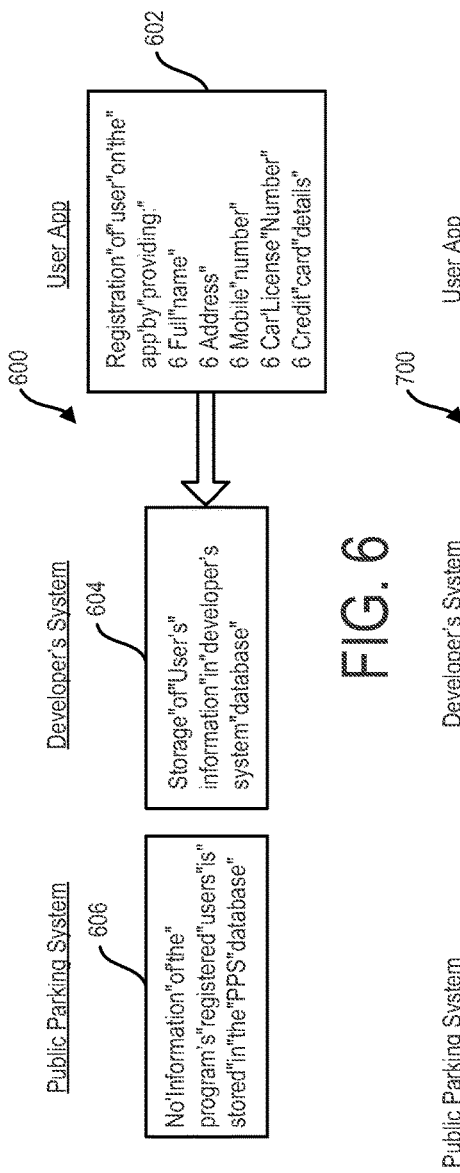
FIG. 6 is a flowchart illustrating a process for registering a user/mobile computing device in the system in accordance with an embodiment.

Now turning to FIG. 6, there is shown a flowchart illustrating a process 600 for registering a user/mobile computing device in the system in accordance with an embodiment.

On the application, the registration of a user is performed by providing: a user's full name, a user's home address and/or email address, a phone number (mobile, landline or other) and/or other contact details, the vehicle's license plate number (or other form of ID for the vehicle) and payment details (credit card, debit card, PayPal® or other form of recognized payment) (step 602).

The supplied registration information is then sent to the application data and processing server 510 where it is stored in the associated system database (step 604). At this point, no information concerning the user is stored in the parking system database (step 606).

Figure 7:
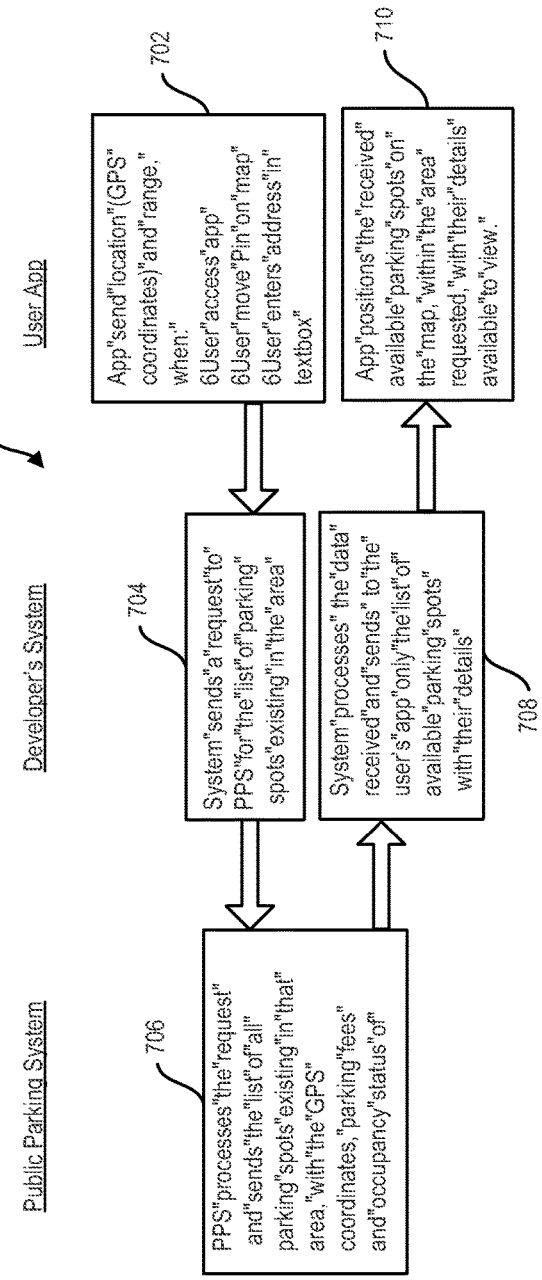
FIG. 7 is a flowchart illustrating a process for looking up on a map the unreserved parking spaces in accordance with an embodiment.

Now turning to FIG. 7, there is shown a flowchart illustrating a process 700 for looking up on a map the unreserved parking spaces in accordance with an embodiment.

At step 702, the application sends location information (GPS coordinates) for the mobile computing device 516 to the application data and processing server 510 when:
- the user accesses the application;
- the user moves the pin on the map; or
- the user enters an address in the textbox on the user interface.

At step 704, the application data and processing server 510 sends a request to the parking system server 504 to obtain a list of all the parking spaces and their coordinates according to the map being displayed on the mobile computing device 516.

At step 706, the parking system server 504, processes the request and sends the list of all the parking spaces and their coordinates according to the map being displayed on the mobile computing device 516 as well as the fees for occupying the parking spaces and the status of occupancy of all the parking spaces.

At step 708, the application data and processing server 510 processes the data received from the parking system server 504 and sends to the mobile computing device 516 only the list of unreserved parking spaces with their details.

At step 710, the application positions the received list of unreserved parking spaces on the map being displayed with their details available for view; e.g., by "clicking" on the icon (dot) for the unreserved parking spaces.

Now turning to FIG. 8, there is shown a flowchart illustrating a process 800 for reserving a parking space in accordance with an embodiment.

At step 802, the user views, on the display of the mobile computing device 516, the details of a selected parking space and chooses a reservation period (initial or revised) and confirms/accepts the reservation.

At step 804, the application data and processing server 510 processes and sends the reservation request to the parking system server 504.

At step 806, the parking system server 504 processes the request, stores the transaction details (license number, parking space ID, reservation period, etc.), update the status of the selected parking space from unreserved to reserved and sends a confirmation signal/message to the application data and processing server 510.

At step 808, the application data and processing server 510 stores the reservation and payment details and sends a confirmation to the mobile computing device 516.

At step 810, the application displays the reservation and payment confirmation and updates the map with the reservation bar at the bottom of the display.

Now turning to FIG. 9, there is shown a flowchart illustrating a process 900 for revising a reservation period for a parking space in accordance with an embodiment.

At step 902, the application sends a revised reservation period request to the application data and processing server 510 when the user selects a revised reservation period and confirms his request.

At step 904, the application data and processing server 510 processes the request and sends the reservation request to the parking system server 504.

At step 906, the parking system server 504 processes the request, stores the transaction details (license number, parking space ID, reservation period, etc.), and sends a confirmation signal/message to the application data and processing server 510.

At step 908, the application data and processing server 510 stores the reservation and payment details and sends a confirmation to the mobile computing device 516.

At step 910, the application displays the reservation and payment confirmation and updates the map with the reservation bar at the bottom of the display.

Figure 10:
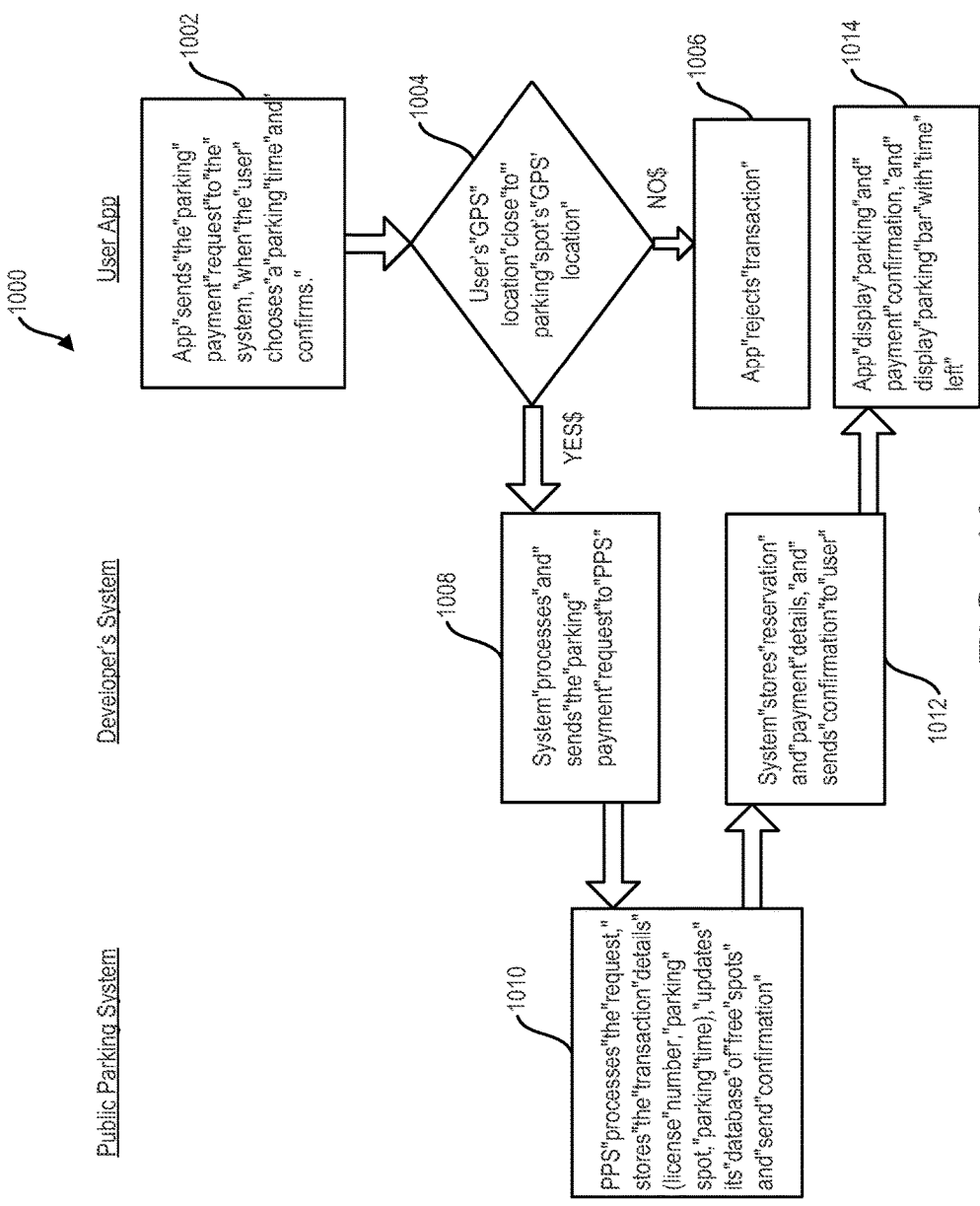
FIG. 10 is a flowchart illustrating a process for payment of a reserved parking space for a vehicle in accordance with an embodiment.

Now turning to FIG. 10, there is shown a flowchart illustrating a process 1000 for payment of a reserved parking space for a vehicle in accordance with an embodiment.

At step 1002, the application sends the parking payment request to the application data and processing server 510 when the user selects a parking occupation period and confirms his payment request.

At step 1004, the mobile computing device 516 uses its GPS to determine if the mobile computing device 516 is within a given range of the parking space. If it is not, the application rejects the transaction (step 1006). If it is, the method proceeds to step 1008.

At step 1008, the application data and processing server 510 processes the request and sends the parking occupation period request to the parking system server 504.

At step 1010, the parking system server 504 processes the request, stores the transaction details (license number, parking space ID, occupation period, etc.), updates the status of the selected parking space from reserved to occupied and sends a confirmation signal/message to the application data and processing server 510.

At step 1012, the application data and processing server 510 stores the occupation and payment/transaction details and sends a confirmation to the mobile computing device 516.

At step 1014, the application displays the occupation and payment confirmation and updates the map with the occupation bar at the bottom of the display.

Now turning to FIG. 11, there is shown a flowchart illustrating a process 1100 for registering a sponsor in the system in accordance with an embodiment.

On the sponsor's website, the registration of a sponsor is performed by providing: a sponsor's name, a sponsor's address and/or email address, a sponsor's contact details, and payment details (credit card, debit card, PayPal® or other form of recognized payment) (step 1102).

The supplied registration information is then sent to the application data and processing server 510 where it is stored in the associated system database (step 1104). At this point, no information concerning the sponsor is stored in the parking system database (step 1106).

Now turning to FIG. 12, there is shown a flowchart illustrating a process 1200 for sponsoring, by a sponsor, selected parking spaces in accordance with an embodiment.

At step 1202, the sponsor uses the sponsor's website to choose the parking spaces they wish to sponsor, the advertisement to be shown and any rewards (discounts on purchases, etc.) for the users.

At step 1204, application data and processing server 510 processes the request, stores the transaction details in the database, and sends a confirmation to the sponsor's website. At this point, no information concerning the sponsor is stored in the parking system database (step 1206).

At step 1208, the parking space sponsorship is displayed on the sponsor's website.

Figure 13:
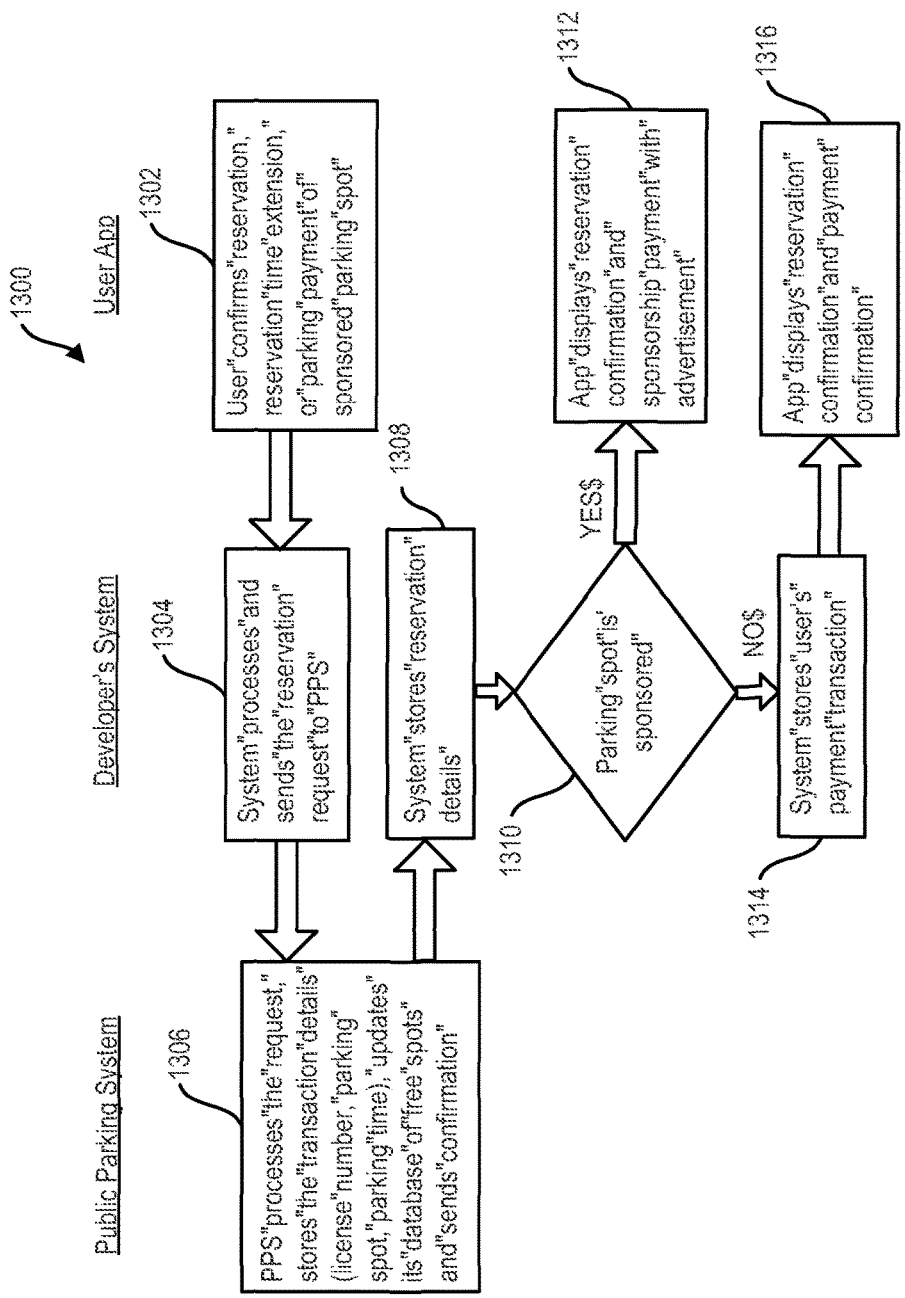
FIG. 13 is a flowchart illustrating a process for payment of selected parking spaces by a sponsor in accordance with an embodiment.

Now turning to FIG. 13, there is shown a flowchart illustrating a process 1300 for payment of selected parking spaces by a sponsor in accordance with an embodiment.

At step 1302, the application sends the parking payment request to the application data and processing server 510 when the user selects confirms a reservation period (initial or revised) or a parking occupation period and confirms his payment request.

At step 1304, the application data and processing server 510 processes the payment request and sends the reservation request to the parking system server 504.

At step 1306, the parking system server 504 processes the request, stores the transaction details (license number, parking space ID, occupation period, etc.), updates the status of the selected parking space from reserved to occupied and sends a confirmation signal/message to the application data and processing server 510.

At step 1308, the application data and processing server 510 stores the occupation details.

At step 1310, the application data and processing server 510 confirms if the parking space is sponsored. If it is, the application data and processing server 510 sends a confirmation to the mobile computing device 516. The application displays the confirmation and the sponsorship payment with the advertisement (step 1312). The application then displays the reservation or occupation and updates the map with the reservation bar or occupation bar at the bottom of the display.

If the parking space is not sponsored, the application data and processing server 510 stores payment/transaction details and sends a confirmation to the mobile computing device 516 (step 1314).

At step 1316, the application displays the reservation or occupation confirmation and payment/transaction confirmation. The application then updates the map with the reservation bar or occupation bar at the bottom of the display.

Other Embodiments and Examples

According to another embodiment, there is described a method for reserving a parking space for a vehicle using a web-enabled computing device (mobile computing device 516 being one type of web-enabled computing device; i.e., in some embodiments, the method would work even though the web-enabled computing device is not mobile) having a display, a user interface and positioning system. The method comprises: requesting, on the user interface and while the web-enabled computing device is at a present location, an unreserved parking space from a plurality of unreserved parking spaces thereby defining a selected unreserved parking space; computing an estimated travel time from the present location of the web-enabled computing device to the selected unreserved parking space; based on the estimated travel time, automatically calculating, and proposing on the user interface (here proposing on the user interface encompasses proposing by the user interface; e.g., in the case where the user interface is a voice activated interface), an initial reservation period for the selected unreserved parking space; accepting, on the user interface, the initial reservation period; and upon the accepting, generating and transmitting, from the web-enabled computing device, a reservation signal to a parking system database, the reservation signal comprising an ID of, and the initial reservation period for, the selected unreserved parking space and instructions for changing a status of the selected parking space from unreserved to reserved in the parking system database. Normally, the reservation signal would also include payment details and an identifier of the web-enabled computing device which is used to make the reservation in order, among other things, to match the web-enabled computing device to an account for the user of the web-enabled computing device.

Examples for the user interface include, but are not limited to, a touch screen, a voice recognition system, a keyboard, etc.

It should be understood that instructions for changing a status are any type of instructions from a transmitting machine (the mobile communication device) and according to the communication protocol for the communication network being used which will make the change of status appear in the machine receiving the instructions (e.g., the parking system database).

While the proposing an initial reservation period is performed on the user interface of the web-enabled computing device, the automatically calculating an initial reservation period is not necessarily performed by the web-enabled computing device. The automatically calculating an initial reservation period may be performed by the web-enabled computing device or in another computing device with which the web-enabled computing device is in communication such as the parking system servers 504 or the application data processing server 510. The automatically calculating an initial reservation period is not performed by the user or another person. It is performed by a computing device/entity.

According to an embodiment, the computing an estimated travel time from the present location of the web-enabled computing device to the selected unreserved parking space includes the travel time for the user holding the web-enabled computing device to the vehicle and the travel time of the vehicle in its present location to the selected unreserved parking space. The travel time for the user holding the web-enabled computing device to the vehicle could include walking, but also any other modes of transportation to get to the vehicle that will travel to the selected reserved parking space.

The computing an estimated travel time may be performed by the web-enabled computing device or in another computing device with which the web-enabled computing device is in communication such as the parking system servers 504 or the application data processing server 510. The computing an estimated travel time is not performed by the user or another person. It is performed by a computing device/entity. The computing an estimated travel time therefore involves computing steps that may include the use as inputs of the average travel time and speed for the vehicle that needs to be parked. According to an embodiment, traffic patterns and/or actual traffic information are taken into account in the computing the estimated travel time. The information in the parking database is continually updated. The parking system database therefore always provides real-time information relayed through the system.

According to another embodiment, the method further comprises accessing, using the web-enabled computing device, the parking system database to obtain: a status of parking spaces indicative of: an occupancy, thereby defining occupied parking spaces and unoccupied parking spaces; and from the unoccupied parking spaces, a reservation status, thereby defining reserved parking spaces and unreserved parking spaces; an ID (identifier) of unreserved parking spaces; a location (coordinates) of each of the unoccupied parking spaces. The parking system database may also include parking rules and/or regulations and traffic/circulation status of the road network.

According to another embodiment, the reservation period is greater than the estimated travel time by a set time margin. According to an example, an estimated travel time is 30 minutes. The initial reservation period should normally be 30 minutes or more. For safety reasons, for an estimated travel time of 30 minutes, the set margin could be 5 minutes and the initial reservation period would be 35 minutes. The set margin could also be calculated using a percentage of the estimated travel time.

According to another embodiment, the method further comprises providing, on the user interface, an option to select a revised reservation period which is different from the initial reservation period. According to an example, the revised reservation period could be longer, but it could also be shorter. It would be longer in a situation where the user knows that he is not yet ready to get to his vehicle, but will do so later (e.g., in a few minutes). It would be shorter, if the user knows that, during this period of the day, there is no traffic and the estimated travel time is probably too high.

According to another embodiment, a difference between the revised reservation period and the initial reservation period is not greater than a limit time margin thereby preventing reservation of a selected unreserved parking space beyond a given threshold period. If the administrator of the system, because of legal or other requirements, determines that the maximum time for which a user should be entitled to make a reservation for a selected unreserved parking space is one hour, then this would be an example of a limit time. Regardless of the limit time, the reserved parking space could be made unoccupied for a certain period during the time the parking space is reserved. More details on this are provided hereinbelow.

According to another embodiment, the method further comprises, during the initial reservation period or the revised reservation period, generating and transmitting, from the mobile computing device 516, an occupation signal to the parking system database, the occupation signal comprising the ID of the selected reserved parking space and instructions for changing the status of the selected parking space from reserved to occupied for an occupation period in the parking system database. Normally, the occupation signal would also include payment details.

According to another embodiment, the method further comprises registering an identity for each of a plurality of vehicles on the parking system database wherein the reservation signal comprises a vehicle identity which is matched to the ID of the selected parking space for which the status is occupied thereby providing a capability to determine whether a vehicle is parked in the parking space for which it is intended. Using this feature would simplify the work of parking ticket inspectors who give out parking tickets to contravener. The ID could include the license plate number of the vehicle. Comparing the information from the parking system database with the license plate number of the vehicle occupying a parking space makes it easy to determine if the vehicle is authorized to be there. The process could be further simplified by using a portable computing device equipped with a camera and a software application capable of recognizing license plate numbers. Alternatively, for vehicles equipped with a positioning system (e.g., a GPS), their location could be stored in the parking system database and the parking ticket inspectors could simply go to the problematic vehicle without having to enter or obtain the license plate number of the vehicle. Furthermore, if a vehicle is in a parking space when it should not be there (during the reservation or occupancy period paid by someone else), a message can be sent to the owner of the vehicle at fault and/or to the user who has reserved the parking space and/or to the authorities which can decide if they will send a towing to remove the vehicle. The system can then identify an alternate unoccupied parking space in the vicinity and let the user decide to accept or to reject the alternate unoccupied parking space.

According to an embodiment, each user is given a unique confirmation code. The confirmation code could be used/ entered upon paying for occupying a parking space. This will allow users to still pay for the parking space even if the user's mobile computing device is unavailable (lost, forgotten at home, broken, dead batteries, etc.).

According to another embodiment, the method further comprises, after the status of the selected parking space is changed from reserved to occupied, determining, using the positioning system, a location of the mobile computing device 516 relative to the occupied parking space thereby defining a relative location, and determining, using the relative location and time, whether the vehicle has left the occupied parking space. For example, upon arriving at the reserved parking space, the user will pay to occupy the parking space. Afterwards, he would normally leave the area of the vehicle at a walking pace. The application data and processing center 510 will perform this calculation and make note of this in its database. When the user return to the car, it will be determined that the mobile computing device 516 and the parking space are in close proximity. If within a set time, it is calculated that the mobile processing is leaving the close proximity of the parking space at a speed which corresponds to the normal vehicle speed, the application data and processing center 510 will perform this calculation and make note of this in its database.

According to another embodiment, the method further comprises, after determining that the vehicle has left the occupied parking space, crediting a user account for the time remaining in the occupation period. This can be performed automatically or a confirm request may be sent to the user and selected by him. For example, a user having paid for 2 hours of parking and leaving after 40 minutes only will be credit 80 minutes to his account for use for parking at a later time.

According to another embodiment, the occupation signal further comprises identification of a user account which is associated to the mobile computing device and from which is debited payment for the occupation of the parking space.

According to another embodiment, the method further comprises, consulting the parking system database to confirm whether the selected parking space is sponsored and, if so, debiting payment for the occupation of the parking space from a sponsor account instead of from the user account.

According to another embodiment, once a grace period passes after the initial reservation period or the revised reservation period, generating and transmitting, from the mobile computing device 516, an availability signal to the parking system database, the availability signal comprising the ID of the selected reserved parking space and instructions for changing the status of the selected parking space from reserved to unoccupied in the parking system database. This covers the situation where a user having reserved a parking space does not show up with his vehicle after a grace period (which could be set to 5 minutes or any other amount of time set by the authorities), the status of the parking space returns to being unoccupied and can be reserved or occupied by another user.

According to another embodiment, a set reservation period is smaller than, and finishes at the same time as, the initial reservation period or the revised reservation period, and further wherein the status of the selected reserved parking space is set to unoccupied for occupation by another vehicle until the set reservation period starts. For example, if a user makes a reservation for a parking space for 2 hours, the authorities could determine that the parking space can be occupied by another vehicle until 15 minutes (the set reservation period) prior to the ending of the reservation period (initial or revised).

According to another embodiment, the reservation status comprises a reservation status for a future period. This covers the situation where the reservation can be made for the next day or any other time in the future. This is normally determined by the authorities responsible for the parking spaces. The future period could also be determined as being a number of hours; e.g., 6 hours.

According to another embodiment, the requesting comprises: showing, on the display, a map taking into account the present location of the mobile computing device 516; and selecting, on the user interface, an unreserved parking space from the unreserved parking spaces.

According to another embodiment, the method further comprises providing, on the display, a remote location different from the present location and showing the map taking into account the remote location.

According to another embodiment, the method further comprises selecting, on the user interface, a distance around the remote location to change a scale of the map thereby resulting in showing more or less unoccupied parking spaces.

According to another embodiment, the positioning system computes a speed at which the mobile computing device 516 is moving; and if the mobile computing device 516 is moving above a given threshold speed, preventing the transmitting of the reservation signal.

According to another embodiment, the method further comprises producing a signal indicative of a distance to an unoccupied parking space (to issue an alarm or other means of alerting a user). This could be applicable to any unoccupied parking space; i.e., the one which is reserved (to facilitate its location) or another parking space which is satisfactory for the user of the vehicle.

According to another embodiment, the method further comprises providing a position of the vehicle prior to the computing the estimated travel time whereby the position of the vehicle is used in the computing the estimated travel time.

According to another embodiment, the computing the estimated travel time comprises computing the estimated travel time from the present location of the mobile computing device 516 to the selected unreserved parking space while using the vehicle.

According to another embodiment, there is described a method for reserving a parking space for a vehicle using a mobile computing device 516 having a display and a user interface. The method comprising: showing, on the display, a map taking into account a present location of the mobile computing device 516; the mobile computing device 516 accessing a parking system database to obtain: a status of parking spaces on the map indicative of: an occupancy, thereby defining occupied parking spaces and unoccupied parking spaces; and from the unoccupied parking spaces, a reservation status, thereby defining reserved parking spaces and unreserved parking spaces; an ID of unreserved parking spaces; a location (coordinates) of each of the unoccupied parking spaces on the map; selecting, on the user interface, an unreserved parking space from the unreserved parking spaces; computing an estimated travel time, including a travel leg using the vehicle, to the selected unreserved parking space; based on the estimated travel time, automatically calculating and displaying, an initial reservation period for the selected unreserved parking space; accepting, on the user interface, the initial reservation period; and upon the accepting, generating and transmitting, from the mobile computing device 516, a reservation signal to the parking system database, the reservation signal comprising the ID of, and the initial reservation period for, the selected unreserved parking space and instructions for changing the status of the selected parking space from unreserved to reserved in the parking system database.

According to another embodiment, there is described a non-transitory machine readable medium encoded with instructions that cause a web-enabled computing device to perform a method comprising the acts of: obtain a request, while the web-enabled computing device is at a present location, for an unreserved parking space from a plurality of unreserved parking spaces thereby defining a selected unreserved parking space; computing an estimated travel time from the present location of the web-enabled computing device to the selected unreserved parking space; based on the estimated travel time, automatically calculating an initial reservation period for the selected unreserved parking space; and upon receiving an acceptance of the initial reservation period, generating and transmitting a reservation signal, the reservation signal comprising an ID of, and the initial reservation period for, the selected unreserved parking space and instructions for changing a status of the selected parking space from unreserved to reserved.

While preferred embodiments have been described above and illustrated in the accompanying drawings, it will be evident to those skilled in the art that modifications may be made without departing from the concept and method of this disclosure. Such modifications are considered as possible variants comprised in the concept and method of this disclosure.

The invention claimed is:

1. A method for reserving a parking space for a vehicle using a mobile computing device having a display, a user interface and a positioning system, the method comprising:
   requesting, on the user interface and while the mobile computing device is at a present location, an unreserved parking space from a plurality of unreserved parking spaces in a parking system database thereby defining a selected unreserved parking space, the unreserved parking spaces being in a location which is different from the present location;
   computing, by the positioning system, an estimated travel time from the present location of the mobile computing device to the selected unreserved parking space;
   based on the estimated travel time, automatically calculating, and proposing on the user interface, an initial reservation period for the selected unreserved parking space;
   accepting, on the user interface, the initial reservation period thereby starting a timer for the time remaining in the initial reservation period;
   upon the accepting, generating and transmitting, from the mobile computing device, a reservation signal to the parking system database, the reservation signal comprising an ID of, and the initial reservation period for, the selected unreserved parking space and instructions for changing a status of the selected unreserved parking space from unreserved to reserved in the parking system database, wherein the initial reservation period starts when performing the accepting;
   during the initial reservation period, generating and transmitting, from the mobile computing device, an occupation signal to the parking system database, the occupation signal comprising the ID of the selected reserved parking space and instructions for changing the status of the selected reserved parking space from reserved to occupied for an occupation period in the parking system database thereby ending the initial reservation period and starting the occupation period, confirmed by an actual position of the mobile computing device as computed by the positioning system, and starting a timer for the time remaining in the occupation period, the timer for the occupation period being distinct from the timer for the initial reservation period; and
   after the status of the selected parking space is changed from reserved to occupied, determining, using the positioning system, a location of the mobile computing device relative to the occupied parking space thereby defining a relative location, and determining, using the relative location and time, whether the vehicle has left the occupied parking space without using a fixed physical sensor for each parking space to determine if each parking space is occupied or not.

2. The method of claim 1, further comprising accessing, using the mobile computing device, the parking system database to obtain:
   a status of parking spaces indicative of:
      an occupancy, thereby defining occupied parking spaces and unoccupied parking spaces; and
      from the unoccupied parking spaces, a reservation status, thereby defining reserved parking spaces and unreserved parking spaces;
   an ID of unreserved parking spaces;
   a location of each of the unoccupied parking spaces.

3. The method of claim 2, wherein the initial reservation period is greater than the estimated travel time by a set time margin.

4. The method of claim 3, further comprising providing, on the user interface, an option to select a revised reservation period which is different from the initial reservation period.

5. The method of claim 4, wherein a difference between the revised reservation period and the initial reservation period is not greater than a limit time margin.

6. The method of claim 5, further comprising registering an identity for each of a plurality of vehicles on the parking system database wherein the reservation signal comprises a vehicle identity which is matched to the ID of the selected parking space for which the status is occupied and determining whether a vehicle is parked in the parking space for which it is intended.

7. The method of claim 5, further comprising, after determining that the vehicle has left the occupied parking space, crediting a user account for the time remaining in the occupation period.

8. The method of claim 5, wherein the occupation signal further comprises identification of a user account which is associated to the mobile computing device and from which is debited payment for an occupation of the parking space.

9. The method of claim 8, further comprising consulting the parking system database to confirm whether the selected parking space is sponsored and, if so, debiting payment for the occupation of the parking space from a sponsor account instead of from the user account.

10. The method of claim 9, further comprising showing an advertisement on the user interface upon confirming that the selected parking space is sponsored.

11. The method of claim 4, wherein once a grace period passes after the initial reservation period or the revised reservation period, generating and transmitting, from the mobile computing device, an availability signal to the parking system database, the availability signal comprising the ID of the selected reserved parking space and instructions for changing the status of the selected parking space from reserved to unoccupied in the parking system database.

12. The method of claim 4, wherein a set reservation period is smaller than, and finishes at the same time as, the initial reservation period or the revised reservation period, and further wherein the status of the selected reserved parking space is set to unoccupied for occupation by another vehicle until the set reservation period starts.

13. The method of claim 2, wherein the reservation status comprises a reservation status for a future period.

14. The method of claim 2, wherein the requesting comprises:
showing, on the display, a map taking into account the present location of the mobile computing device; and
selecting, on the user interface, an unreserved parking space from the unreserved parking spaces.

15. The method of claim 14, further comprising providing, on the display, a remote location different from the present location and showing the map taking into account the remote location.

16. The method of claim 15, further comprising selecting, on the user interface, a distance around the remote location to change a scale of the map thereby resulting in showing more or less unoccupied parking spaces.

17. The method of claim 1, further comprising producing a signal indicative of a distance to an unoccupied parking space.

18. The method of claim 1, further comprising providing a position of the vehicle prior to the computing the estimated travel time whereby the position of the vehicle is used in the computing the estimated travel time.

19. The method of claim 18, wherein the computing the estimated travel time comprises computing the estimated travel time from the present location of the mobile computing device to the selected unreserved parking space while using the vehicle.

20. A method for reserving a parking space for a vehicle using a web-enabled computing device having a display, a user interface and a positioning system, the method comprising:
showing, on the display, a map taking into account a present location of the web-enabled computing device;
the web-enabled computing device accessing a parking system database to obtain:
a status of parking spaces on the map indicative of:
an occupancy, thereby defining occupied parking spaces and unoccupied parking spaces; and
from the unoccupied parking spaces, a reservation status, thereby defining reserved parking spaces and unreserved parking spaces;
an ID of unreserved parking spaces;
a location of each of the unoccupied parking spaces on the map;
selecting, on the user interface, an unreserved parking space from the unreserved parking spaces;
computing, by the positioning system, an estimated travel time from the present location of the web-enabled computing device to the selected unreserved parking space;
based on the estimated travel time, automatically calculating, and displaying on the display, an initial reservation period for the selected unreserved parking space;
accepting, on the user interface, the initial reservation period thereby starting a timer for the time remaining in the initial reservation period;
upon the accepting, generating and transmitting, from the web-enabled computing device, a reservation signal to the parking system database, the reservation signal comprising the ID of, and the initial reservation period for, the selected unreserved parking space and instructions for changing the status of the selected unreserved parking space from unreserved to reserved in the parking system database; wherein the initial reservation period starts when performing the accepting;
during the initial reservation period, generating and transmitting, from the web-enabled computing device, an occupation signal to the parking system database, the occupation signal comprising the ID of the selected reserved parking space and instructions for changing the status of the selected reserved parking space from reserved to occupied for an occupation period in the parking system database thereby ending the initial reservation period and starting the occupation period confirmed by an actual position of the web-enabled computing device as computed by the positioning system, and starting a timer for the time remaining in the occupation period, the timer for the occupation period being distinct from the timer for the initial reservation period; and
after the status of the selected parking space is changed from reserved to occupied, determining, using the positioning system, a location of the web-enabled computing device relative to the occupied parking space thereby defining a relative location, and determining, using the relative location and time, whether the vehicle has left the occupied parking space without using a fixed physical sensor for each parking space to determine if each parking space is occupied or not.

21. A non-transitory machine readable medium encoded with instructions that cause a web-enabled computing device having a positioning system to perform a method comprising the acts of:
receiving a request, while the web-enabled computing device is at a present location, for an unreserved parking space from a plurality of unreserved parking spaces in a parking system database thereby defining a selected unreserved parking space, the unreserved parking spaces being in a location which is different from the present location;
computing an estimated travel time from the present location of the web-enabled computing device to the selected unreserved parking space;
based on the estimated travel time, automatically calculating an initial reservation period for the selected unreserved parking space thereby starting a timer for the time remaining in the initial reservation period;
upon receiving an acceptance of the initial reservation period, generating and transmitting a reservation signal, the reservation signal comprising an ID of, and the initial reservation period for, the selected unreserved parking space and instructions for changing a status of the selected unreserved parking space from unreserved to reserved in the parking system database, wherein the initial reservation period starts when performing the accepting;

during the initial reservation period, generating and transmitting, from the web-enabled computing device, an occupation signal to the parking system database, the occupation signal comprising the ID of the selected reserved parking space and instructions for changing the status of the selected reserved parking space from reserved to occupied for an occupation period in the parking system database thereby ending the initial reservation period and starting the occupation period confirmed by an actual position of the web-enabled computing device, as computed by the positioning system, thereby starting a timer for the time remaining in the occupation period, the timer for the occupation period being distinct from the timer for the initial reservation period; and after the status of the selected parking space is changed from reserved to occupied, determining, using the positioning system, a location of the web-enabled computing device relative to the occupied parking space thereby defining a relative location, and determining, using the relative location and time, whether the vehicle has left the occupied parking space without using a fixed physical sensor for each parking space to determine if each parking space is occupied or not.

* * * * *